United States Patent [19]

Patel

[11] 4,136,293
[45] Jan. 23, 1979

[54] MULTI-ACTUATOR SYSTEM USING SINGLE MAGNETIC CIRCUIT

[75] Inventor: Tulsidas R. Patel, San Jose, Calif.

[73] Assignee: International Business Machines Corporation, Armonk, N.Y.

[21] Appl. No.: 849,134

[22] Filed: Nov. 7, 1977

[51] Int. Cl.$^2$ .......................................... H02K 41/02
[52] U.S. Cl. .......................................................... 310/13
[58] Field of Search ....................... 310/13, 27, 12, 14

[56] References Cited

U.S. PATENT DOCUMENTS

| | | | |
|---|---|---|---|
| 3,439,198 | 4/1969 | Lee ........................................ | 310/13 |
| 3,746,937 | 7/1973 | Koike .................................... | 310/13 X |
| 3,816,777 | 6/1974 | Metzgar et al. ....................... | 310/13 |
| 3,889,139 | 6/1975 | Hughes ................................. | 310/13 |
| 3,896,319 | 7/1975 | Chari .................................... | 310/27 X |
| 3,924,146 | 12/1975 | George ................................ | 310/12 X |
| 4,075,517 | 2/1978 | Adler .................................... | 310/13 |

Primary Examiner—Donovan F. Duggan
Attorney, Agent, or Firm—Richard E. Cummins

[57] ABSTRACT

A voice coil motor having a plurality of independent coils movable within annular flux gaps which are supplied in parallel with flux from a single permanent magnet. The actuator comprises a single permanent magnet mounted to a low reluctance backing plate, a plurality of pole pieces, and a low reluctance casing including an integral pole plate provided with a like plurality of pole piece receiving apertures. The casing extends from the perimeter of the pole plate portion to the backing plate completely surrounding the pole pieces, coils and the magnet.

Each pole piece has a rectangular base attached to the permanent magnet and a cylindrical portion which extends into the pole plate portion to define the annular gap, the axis of which is generally normal to the permanent magnet. Adjacent pole pieces abut each other along one edge to assist in maintaining a balanced magnetomotive force to the pole pieces. The axial length of the coil is less than the axial length of the annular air gap to provide a short coil long gap type of actuator and thereby minimize any interaction between the separate parallel flux paths which extend from the permanent magnet.

15 Claims, 4 Drawing Figures

MULTI-ACTUATOR SYSTEM USING SINGLE MAGNETIC CIRCUIT

FIELD OF INVENTION

The invention relates to linear electromagnetic actuators and specifically to linear actuators of the type referred to in the art as voice coil motors.

PRIOR ART

Voice coil motors are used in various applications which effectively dictate the specific design of the coil, magnet structure and the manner in which the movement of the coil is translated to the member to be moved or positioned. One application where voice coil motors have been used extensively is in magnetic disk storage devices to position magnetic transducers relative to a selected one of a plurality of concentric recording tracks on a continuously moving magnetic disk. An article entitled "Engineering Design of A Disk Storage Facility with Data Modules" by R. Mulvany, published in the IBM Journal of Research and Development in November of 1974, discusses some of the design concepts and requirements for disk files and voice coil motors for disk files. In such applications, the voice coil motor must generally operate in two modes, namely a track accessing mode and a track following mode. The track accessing mode is characterized by the coil being moved quite rapidly from one track position to another involving rapid acceleration and deceleration periods in the order of milliseconds. The track following mode is characterized by the coil being moved only very small distances in the order of milli-inches so as to follow the center line of a recorded track. Response time of the coil and head carriage to the signals produced by the positioning system becomes significant as do any external factors which might alter the flux in the air gap or current in the coil.

The increase in the ability to record data at higher densities and the ability to position a transducer more accurately so that track densities can be higher has provided the capacity to make more compact disk files by reducing both the number of disks in the file and by using smaller disks. This has resulted in the desire for more compact linear actuators. The advantage of using more than one actuator per stack of rotating disks has been recognized in the art as a distinct advantage from a system throughput standpoint provided it does not increase the cost of storing data or the cost of packaging the disk file. Further, where a disk file is provided with a plurality of actuators, it is desirable to position the actuators with the axis of the coils in a plane so that when the actuator is packaged in the file, it is possible to remove the head disk assembly and the coils of the voice coil motor without removing the relatively heavier magnet structure, as taught in U.S. 4,034,441. The placement of the coil axis in the same plane permits the coils to be mounted permanently to the head carriage assembly and the head disk assembly so that removal of the head disk assembly in a direction parallel to the plane of the coil axis is facilitated.

By supplying each cylindrical pole piece with flux from a common permanent magnet and where each pole piece base is in contact with both the magnet and an adjacent pole piece, a more uniform magnetomotive force is applied to each of the coils. It has been found in accordance with the present invention that the ability of one coil to operate in a track following mode is not adversely affected by the other coil operating in a track positioning mode even though they share a common source of magnetomotive force.

SUMMARY OF THE INVENTION

The present invention is directed to a voice coil motor arrangement having a plurality of independently energizable movable coils adapted to move separate head/arm assemblies, wherein a common magnet structure and pole pieces are arranged to allow all the coils to be removable with the head disk assembly. It has been found that by employing a common source of magnetomotive force, i.e., a common permanent magnet, the size and position of the independent pole pieces which define the inner boundary of the annular flux gap relative to the pole face, results in a compact design which permits positioning the coils relatively close together with the coil axes in a plane which contains the axis of the disk stack. It has also been found that by positioning adjacent pole pieces so that adjacent surfaces are in contact, any variations in the amount of magnetomotive force throughout the common permanent magnetic are effectively balanced out in the pole pieces.

It is therefore an object of the present invention to provide a compact linear actuator having a plurality of coils movable independently within annular flux gaps whose axes are in the same plane and which are supplied with a uniform flux from a single permanent magnet.

A further object of the present invention is to provide a linear actuator having a plurality of coils independently movable in separate flux gaps supplied from a common permanent magnet wherein the movement of one coil within its annular flux gap in response to energization of the coil does not adversely affect the operation of the other coil.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 2:
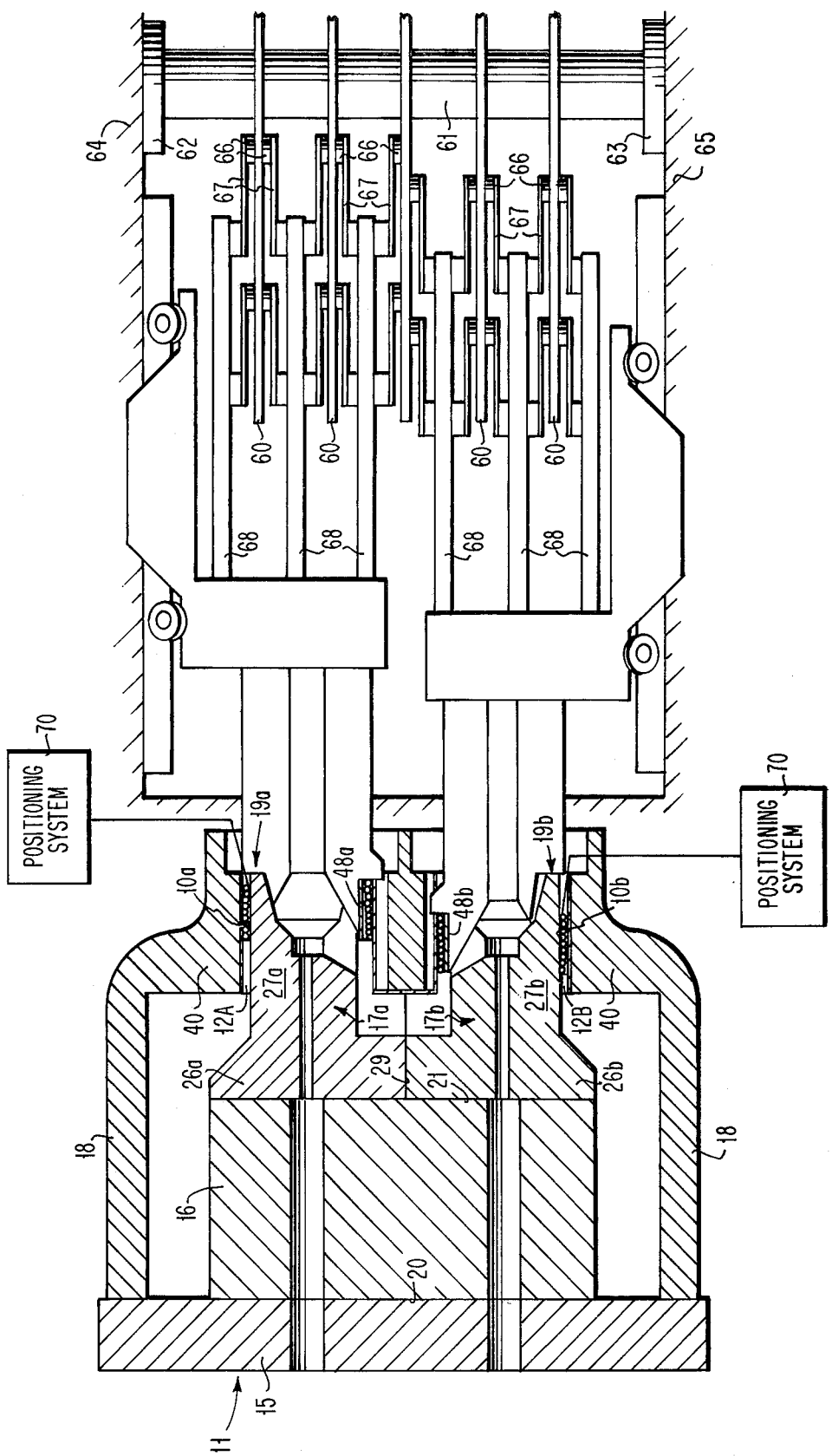
FIG. 2 illustrates an embodiment of the linear actuator shown in FIG. 1 as used in a disk file, the actuator being shown in a sectional view.

As shown in FIG. 2, the actuator comprises a plurality of individually movable coils 10a and 10b and the stationary assembly 11 which functions to define annular flux gaps 12a and 12b in wich the coils 10a and 10b are positioned.

The stationary assembly 11 comprises a backing plate 15, a permanent magnet 16, a plurality of pole pieces 17a and 17b and a unitary housing 18 which has one portion provided with a plurality of annular openings 19a and 19b. Each annular opening 19 together with one of the pole pieces 17 define one of the annular flux gaps 12 in which the coil 10 moves. The remaining portion of the unitary housing 18 extends to the backing plate 15 and completely surrounds the pole pieces 17 and the permanent magnet 16.

Figure 1:
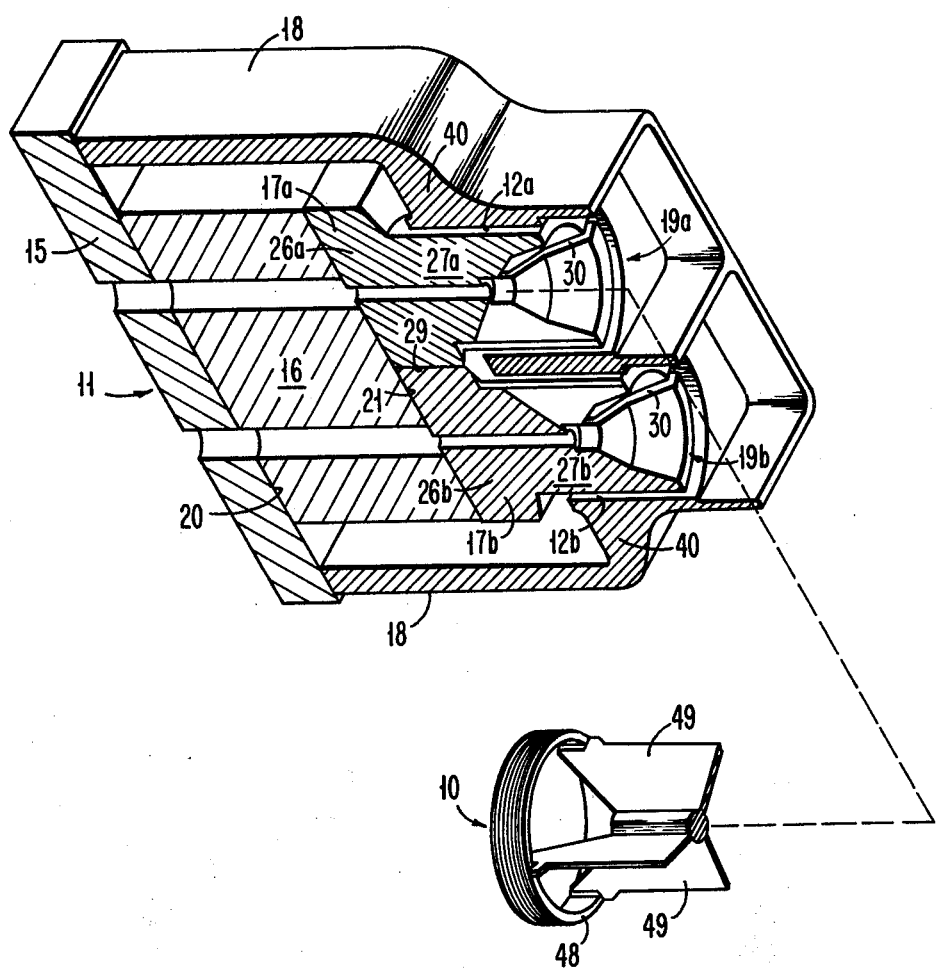
FIG. 1 is a perspective view of the improved linear actuator embodying the present invention.

As shown in FIG. 1, permanent magnet 16 is rectangular in shape and is attached at one surface 20 to the backing plate 15 by any suitable means. The opposite surface 21 of magnet 16 is adapted to receive each pole piece 17 with the axis of the cylindrical portion of the pole piece normal to the surface 20. Pole piece 17 as shown, has a rectangular base portion 26 and an integral cylindrical portion 27. The base portion 26 is attached to the permanent magnet to provide a low reluctance joint between the permanent magnet and the pole piece. The height of the base portion is sufficient to provide a side surface 29 for each pole piece which is in contact with the corresponding side surface of the adjacent pole piece.

In theory the magnetomotive force applied to each pole piece is equal. However, in practice, some variation does exist between the amount of magnetomotive force applied to the base portion of each pole piece for a number of practical reasons. This variation can reach plus or minus 10% of commercial magnets. While it is possible to obtain permanent magnet material with tighter tolerances, the cost increases substantially as the tolerances decrease. In addition, it should be understood for ease of manufacture the magnetic block is not actually permanently magnetized until the entire structure is completely assembled, including the housing. The entire assembly is then subjected to a strong theoretically uniform magnetic field which "charges" the magnetic material.

In practice, the magnetic material is not uniform nor is the charging field uniform. Also in practice, the reluctance of the joint between one base and the magnetic surface is different than the reluctance of the other joint. By contacting a side surface of adjacent pole pieces, a magnetic shunt circuit is provided between the two parallel magnetic circuits. Such an arrangement ensures more uniformity of the flux in the annular gap since the amount of flux in the cylindrical portion of the pole piece adjacent to each annular gap becomes balanced. The reluctance of the joint formed by the side surfaces is considerably less than the reluctance of either of the annular gaps.

The upper portion 27 of the pole piece 17 is cylindrical in shape and defines the inner diameter of the annular flux gap 12. The axis of the cylindrical portion 27 is substantially normal to the flat surface of the rectangular base 26.

As shown in FIG. 1, the cylindrical portion 27 is provided with three axial extending slots 30 which are spaced circumferentially apart 120° from each other. The purpose of the slots in pole piece 27 and the manner in which coil 10 is attached to the head carriage assembly will be explained in detail later on in connection with FIG. 2. Briefly, however, coil 10 is attached to a ring member 48 which is provided with three radially extending fin elements 49 which cooperate with the three axially extending slots 30, similar in function to the arrangement shown on page 499 of the Mulvany article referred to earlier. It should be understood that while only one coil and ring assembly are shown in FIG. 1, in practice each pole piece is provided with a coil and ring member 48.

The unitary housing member 18 has one portion 40 which forms the front pole piece of the actuator and is provided with a plurality of annular apertures 19a and 19b each of which defines the outer diameter of the annular flux gap 12. The remaining portion of the unitary housing forms a low reluctance magnetic path to the perimeter of the backing plate 15.

The thickness of the front pole piece portion 40 of the housing is sufficient to define in cooperation with one of the cylindrical pole pieces an annular gap 12 having an axial length which is substantially longer than the axial length of the coil 10 so that the coil is always positioned within the gap 12 at either extremity of its two movements.

FIG. 2 illustrates an application of the voice coil motor shown in FIG. 1 to the positioning of magnetic transducers in a magnetic disk storage device. The magnetic disk storage device is shown diagrammatically in FIG. 2 and includes a plurality of disks 60 which are mounted on a rotatable shaft 61. Shaft 61 is provided with a suitable set of bearings 62 and 63 attached to rigid support members 64 and 65. A pair of head/arm carriage assemblies 66 and 67, which include a plurality of head/arms 68, are mounted to the support members 64 and 65. Supports 64 and 65 may form part of a removable head disk assembly which is completely enclosed except for that portion of the carriage assembly which coacts with the stationary portion of the actuator.

Each carriage assembly as shown is provided with a ring member 48 to which one of the actuator coils 12 is attached as described in connection with FIG. 1. Suitable energization of the coil 12 from the positioning system shown by block 70 causes movement of the carriage radially relative to the axis of the shaft 61. It will be seen that the construction of the stationary part of the multicoil actuator with the axis of the annular air gaps in the same plane permits the coil portions of the actuator to be permanently associated with the removable assembly since the entire assembly may be removed in direction of the plane of the coil axes.

Since it is desirable to drive the carriage assembly through its center of mass to avoid any adverse effects of mechanical resonance resulting from a series of accessing operations, the ability to vary the center to center spacing of the pole pieces is important. The spacing of the disks axially on the shaft determines the spacing of the head/arm assemblies on the carriage which in turn affects the design of the carriage for the head/arm thereby determining its center of mass. In order to make a disk file more compact, trade offs between these spacings become significant and interdependent.

The center to center spacing of the pole pieces effectively dictates the amount of soft iron material which is present in the area between the annular apertures 19A and 19B. Since this area is most sensitive to saturation and pole piece interaction, there is a tendency for the amount of flux at this point in the flux gap to vary relative to the remaining portion of the flux gap. If this occurs, that portion of the coil would react differently resulting in a twisting moment being applied to the coil, the carriage assembly and ultimately to the magnetic heads. This twisting moment occurs about a line normal to the axis of the coil and in the radial plane containing the area of different flux density. It has been found that any effects on the coil resulting from the tendency of the area between the apertures to saturate can be minimized by positioning one of the axially extending slots of the pole piece adjacent this area.

Where the movement of the coil is translated to the member to be positioned by means of an arrangement similar to that shown in FIGS. 1 and 2, in which the ring member supporting the coil is provided with radially extending fins, the circumferential position of the fins and the slots in the pole pieces can be arranged to desensitize any effect on the movement of the coil as a result of the area between the annular openings tending to become saturated. As shown in FIG. 1, the slots in the adjacent pole pieces are positioned such that they are adjacent each other in this area and the two remaining radial slots of each pole piece are positioned such that the effect on the coil is balanced.

The result of such a construction allows the center to center spacing of the pole pieces to be shorter allowing more design flexibility in the spacing of the disks, the placement of the head/arm assemblies on the carriage and the carriage design itself.

Figure 3:
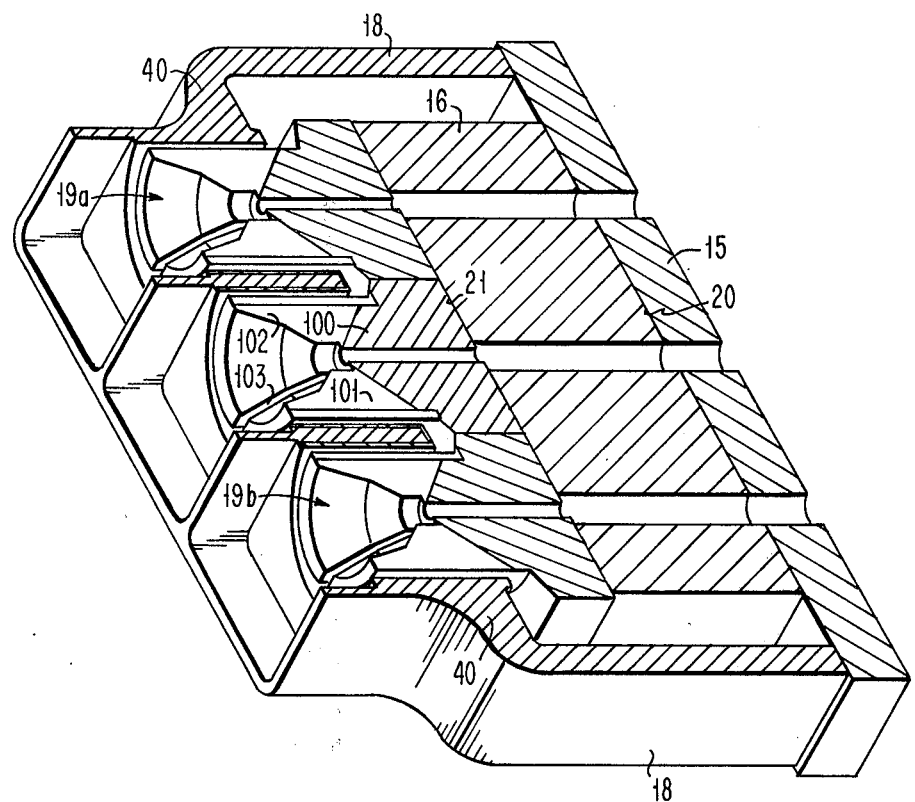
FIG. 3 shows another embodiment of the invention employing 3 coils.

FIG. 3 illustrates an actuator employing multiple coils. The arrangement is quite similar to the dual coil arrangement shown in FIG. 1, except for the provision of an additional pole piece and the placement of the slots in the pole pieces. As shown more fully in FIG. 4, the middle pole piece 100 is provided with two slots 101, 102 disposed diametrically opposite each other and in a plane containing the axes of all the circular pole pieces. As shown, two additional slots 103 and 104 may be provided when the ring member of the carriage which is attached to the coil is provided with four equally spaced fin members.

Figure 4:
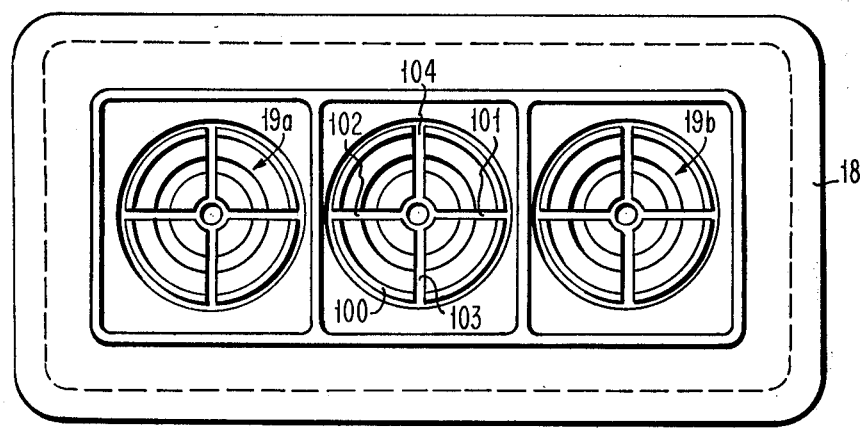
FIG. 4 is a top view of the 3 coil actuator shown in FIG. 3 illustrating the placement of the radial slots in each pole piece.

The operation of the magnetic structure shown in FIG. 4 is identical to that described in connection with FIGS. 1-3.

While the invention has been particularly shown and described with reference to a preferred embodiment thereof, it will be understood by those skilled in the art that various changes in the form and details may be made therein without departing from the spirit and scope of the invention.

What is claimed is:

1. A multiple coil linear actuator comprising in combination
   a low reluctance backing plate,
   a single permanent magnet having two opposite planar surfaces one of which is attached to said backing plate
   a plurality of pole pieces each of which comprises a base portion and having one planar surface in contact with said magnet and at least one side surface adapted to contact a corresponding side surface of an adjacent pole piece, and a cylindrical pole portion integral with said base portion,
   each of said base portions being attached to the said other planar surface of said permanent magnet with the axis of said cylindrical portion normal to said planar surfaces of said magnet, each of said base portions being in contact with an adjacent base portion along said corresponding side surface,
   A single unitary housing having a pole plate portion provided with a like plurality of annular pole piece receiving aperatures, with the remaining portion extending from said pole plate portion to the perimeter of said backing plate enclosing said permanent magnet and said pole pieces,
   means removably attaching said housing to said backing plate so as to position each said pole piece in one of said annular pole piece receiving apertures to thereby define a plurality of annular flux gaps each of which is in a separate parallel magnetic circuit with said permanent magnet whereby the same substantially uniform flux distribution is obtained throughout said gaps, and
   and a cylindrical coil member disposed in each of said gaps, the axial length of said coil being less than the axial length of the annual gap to maintain said coil completely with said gap during movement,
   each said coil adapted to be independently energized to cause movement thereof within its annular gap without effecting either the position or movement of any other coil relative to its annular gap.

2. The actuator defined by claim 1 in which said plurality of pole pieces is two.

3. The actuator defined by claim 2 in which means for minimizing the effect of saturating the pole plate area between annular gaps is associated with each said annular gap.

4. The actuator defined by claim 3 in which said means for minimizing the saturation effect includes providing an axial extending slot in each said pole piece adjacent the area between adjacent said annular openings.

5. The actuator defined by claim 4 in which additional radial extending slots are provided in said pole pieces to balance the effect on the associated coil caused by the slots disposed adjacent to said area between adjacent said openings.

6. The actuator defined by claim 1 in which said permanent magnet is magnetized in a direction normal to said two opposite planar surfaces, which results in the magnitude of the magnetomotive force supplied to the base of each pole piece being unequal.

7. The actuator defined by claim 1 in which said permanent magnet is magnetized in a direction normal to said two opposite planar surfaces and the area of said side surface of adjacent said pole pieces is sufficiently large to permit any imbalance in the magnetomotive force applied to the bases of said pole pieces to be effectively compensated for by providing a low reluctance shunt path between the parallel magnetic circuits defined by said pole pieces.

8. The combination defined by claim 7 further including means for energizing each said coil independently.

9. The combination defined by claim 7 in which means for minimizing the effect of saturating the pole plate area between annular gaps is associated with each said annular gap.

10. The combination defined by claim 9 in which said means for minimizing the saturation effect includes providing on radial extending slot in each pole piece in the area between adjacent said annular openings.

11. The actuator defined by claim 10 in which additional slots are provided in each pole piece to balance the effect on the associated coil caused by said one slot.

12. The combinatin defined in claim 9 in which each said coil is adapted to be attached to a different ring member having a plurality of radially extending fins and each said pole piece is provided with a like plurality of axially extending slots through which said fins move when said coil is energized.

13. The combination recited in claim 12 in which one slot of each pole piece is in the plane containing the axes of said pole pieces and adjacent the area intermediate said annular openings.

14. The combination defined in claim 7 in which said pluarlity of pole pieces is more than two with each pole piece which is intermediate two other pole pieces being provided with at least two opposed radial extending slots for minimizing saturating effects, all of said slots being positioned in the plane containing the axes of said plurality of pole pieces.

15. The combination defined in claim 14 in which each said pole piece is provided with two axially extending slots disposed in said plane.

* * * * *